July 14, 1931. F. T. ROBERTS, JR 1,814,569
AUTOMOBILE ATTACHMENT FOR JACKS
Filed Nov. 15, 1926
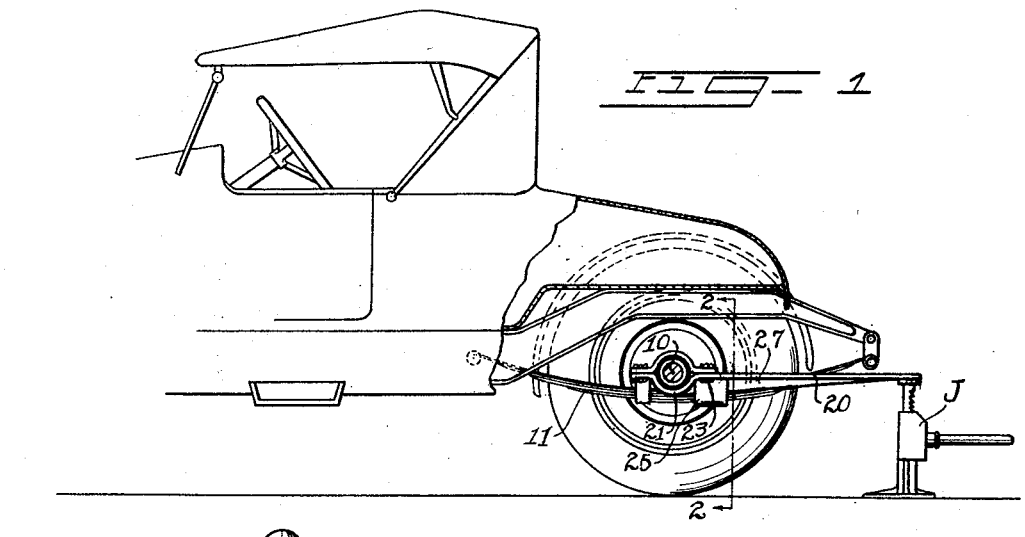
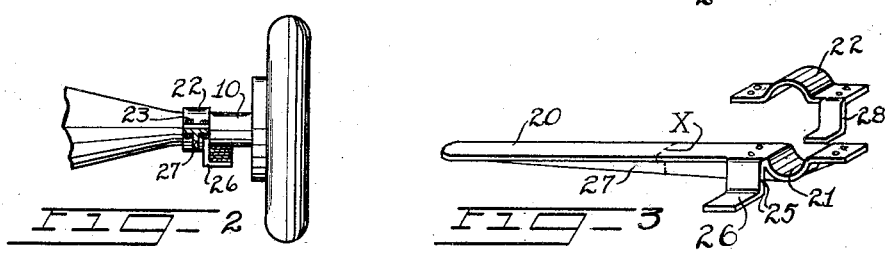
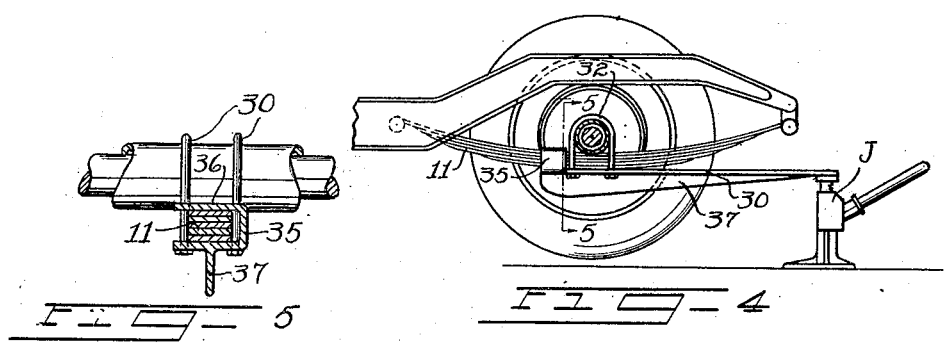
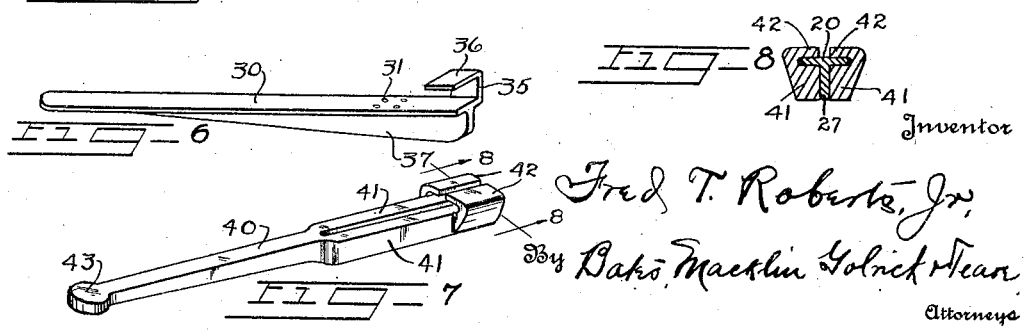

Patented July 14, 1931

1,814,569

UNITED STATES PATENT OFFICE

FRED T. ROBERTS, JR., OF MONTCLAIR, NEW JERSEY

AUTOMOBILE ATTACHMENT FOR JACKS

Application filed November 15, 1926. Serial No. 148,368.

This invention relates to a device adapted to be attached to an automobile and form a conveniently accessible seat for the head of a lifting jack. With modern automobiles, the space available for placing the jack, particularly at the rear, is very limited, and what space is available is not readily accessible, so that there is more or less difficulty in placing the jack beneath the axle and one is liable to soil his garments in doing so. The difficulty is increased with an automobile having balloon tires on account of the lateral spread of such tires when flat, as well as the necessity for placing the jack where the lift may be high.

I have discovered that these difficulties may be obviated by equipping the automobile with a longitudinally projecting member, firmly anchored adjacent its inner end so that its cantilevered outward portion may furnish an accessible seat, to be engaged by the jack. The member may be a continuous bar or may have a removable outer extension carrying the jack seat. I prefer to accomplish the anchoring by securing the member in one region by means passing about the axle housing and providing such a member with a lip which extends across the spring onto such face thereof that the lip will bear against the spring when the outer end of the member is raised.

I have shown my attachment herein in different forms, in one of which a bar clamped near its end about the axle and intermediately has a lip engaging beneath the spring, and in another of which a bar clamped intermediately about the axle and has a lip at the far end engaging the top of the spring. I have also shown a removable extension bar which may be slid onto a curtailed portion of the bar anchored to the axle and spring. In any case a cantilever is provided which extends to a readily accessible point, and the difficulty of the placing of the jack is thus entirely avoided.

In the drawings, Fig. 1 is a fragmentary side elevation of an automobile provided at the rear with one form of my attachment; Fig. 2 is a cross section of this form of attachment, as indicated by the line 2—2 in Fig. 1 looking forwardly; Fig. 3 is a perspective of such attachment itself; Fig. 4 is a fragmentary side elevation of an automobile equipped with my attachment in a different form; Fig. 5 is a vertical cross section of the form shown in Fig. 4 looking toward the rear; Fig. 6 is a perspective of this latter form of attachment; Fig. 7 is a perspective of a removable extention bar which may be employed if desired; Fig. 8 is a cross section on the line 8—8 of Fig. 7.

Referring first to Figs. 1, 2 and 3, 10 designates the rear axle housing of an automobile, and 11 the adjacent rear spring. My attachment, as shown in these figures, comprises a bar 20 having a depressed seat 21 to engage the under half of the axle and a cap 22 to engage the upper half. This cap is held unto the bar proper by bolts 23. The side of the bar has a downwardly extending portion 25 from the end of which extends a lateral lip 26, which is adapted to lie beneath the spring and engage the under face thereof. The bar is shown as stiffened by a web 27.

Such a bar as just described is clamped rigidly on the axle housing by the cap and bolts and extends to a convenient region (as shown beyond the end of the car) so that a jack, indicated at J may be readily placed beneath it. When the lift head of such jack is elevated, my projecting bar cannot turn about the axle 10 by reason of the lip 26 and accordingly the whole attachment must move upwardly bodily, thus raising the car.

In the embodiment shown in Figs. 4, 5 and 6, I have shown a bar 30 adapted to lie beneath the spring and secured to the axle by a pair of U-bolts 32. These may be the standard U-bolts of the car spring, the bottom pad of the spring being simply removed and my attachment substituted, the U-bolts passing through openings 31 in the bar. The bar is provided with an upwardly extending portion 35 from which extends a lateral lip 36 adapted to engage the top of the spring at the rear of the axle housing. The under side of the bar is preferably reinforced by a web 37.

It will be seen that when the jack J is placed under the bar 30 and the jack head moved upwardly the bar cannot swing around the axle on account of the lip 36 engaging the top surface of the spring, accordingly the bar must move upwardly as a unit, thus raising the car.

In the form of the invention last described the extension of the bar inwardly beyond the axle, in this case beneath the spring, not only makes it a proper spring pad but prevents the free end of the bar sagging when the car is in use. In the embodiment shown in Figs. 1, 2 and 3 the friction of the clamp on the axle housing may be relied on to prevent sagging of the bar or the attachment may have some additional engagement with the spring. I have shown the cap 22 as provided with a lip 28 adapted to engage beneath the spring on the opposite side of the axle from the main lip 26.

If desired, instead of a single bar 20 or 30 extending from the axle to the jack, the anchored bar need extend only a sufficient distance to carry firmly a removable extension against which the jack may act. For instance, the bar 20 might be cut off in the region indicated by the broken line X in Fig. 3 and such an extension, as shown in Figs. 7 and 8, slid over the portion of the bar remaining. Such extension designated 40 is shown as having a forked inner end 41, the tines of which may extend on opposite sides of the web 27, each tine having at its inner end an upwardly extending lip 42 adapted to lie on top of the horizontal portion of the bar 20. The outer end of the extension may be provided with an enlarged portion 43 for a jack seat.

If the slidable bar is employed, there need be only one such extension for the car, which may be carried in the tool box with the jack, each of the permanent fittings being adapted to receive this extension.

It will be seen that each embodiment comprises a longitudinally extending member clamped by means passing about the axle housing and having a lip engaging the spring so that the member may not turn about such housing. The device is simple in construction, and is readily applied, and very effective in providing an accessible seat for the jack head.

I claim:

1. An automobile attachment comprising a member extending lengthwise of the car and engaging the axle and having a crosswise lip engaging the spring, said member being adapted to provide a seat for a jack head.

2. The combination with an automobile having an axle and a spring, of a bar held in place in the region adjacent the axle, said bar being provided with a transverse lip engaging one of the substantially horizontal surfaces of the spring, said bar projecting longitudinally from the axle, whereby a jack placed at the outer end of the bar may serve to raise the car.

3. The combination with a car axle and a longitudinal spring secured thereto, of a bar extending lengthwise of the car at a different height from the spring, said bar being associated with the axle and having laterally extending lips engaging the spring on opposite sides of the axle, whereby the relative rotation of the bar about the axle is prevented.

4. The combination in an automobile having an axle and spring, of a bar on the underside of the spring, a U-bolt for clamping the bar to the axle, said U-bolt being so placed that a relatively short end of said bar is on one side of the bolt, and a relatively longer end on the other side thereof, the short end of said bar having an upwardly extending lip adapted to overlie the top of the spring, and the long end of said bar being adapted to receive the head of an automobile jack.

In testimony whereof, I hereunto affix my signature.

FRED T. ROBERTS, Jr.